(12) United States Patent
Ljolje

(10) Patent No.: US 8,612,234 B2
(45) Date of Patent: *Dec. 17, 2013

(54) MULTI-STATE BARGE-IN MODELS FOR SPOKEN DIALOG SYSTEMS

(75) Inventor: Andrej Ljolje, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/279,443

(22) Filed: Oct. 24, 2011

(65) Prior Publication Data

US 2012/0101820 A1    Apr. 26, 2012

Related U.S. Application Data

(63) Continuation of application No. 11/930,619, filed on Oct. 31, 2007, now Pat. No. 8,046,221.

(51) Int. Cl.
*G10L 15/00* (2013.01)

(52) U.S. Cl.
USPC ............ 704/275; 704/233; 704/260; 715/728

(58) Field of Classification Search
USPC .................... 704/233, 260, 275; 715/728
See application file for complete search history.

(56) References Cited

U.S. PATENT DOCUMENTS

| | | | |
|---|---|---|---|
| 5,475,791 A * | 12/1995 | Schalk et al. | 704/233 |
| 5,765,130 A | 6/1998 | Nguyen | |
| 6,246,986 B1 | 6/2001 | Ammicht et al. | |
| 6,321,194 B1 * | 11/2001 | Berestesky | 704/232 |
| 6,882,973 B1 * | 4/2005 | Pickering | 704/270 |
| 7,318,030 B2 * | 1/2008 | Guduru | 704/243 |
| 2003/0083874 A1 | 5/2003 | Crane et al. | |
| 2003/0088411 A1 | 5/2003 | Ma et al. | |
| 2005/0027527 A1 | 2/2005 | Junkawitsch et al. | |
| 2007/0088548 A1 | 4/2007 | Yamamoto et al. | |

* cited by examiner

*Primary Examiner* — Daniel D Abebe

(57) ABSTRACT

A method is disclosed for applying a multi-state barge-in acoustic model in a spoken dialogue system. The method includes receiving an audio speech input from the user during the presentation of a prompt, accumulating the audio speech input from the user, applying a non-speech component having at least two one-state Hidden Markov Models (HMMs) to the audio speech input from the user, applying a speech component having at least five three-state HMMs to the audio speech input from the user, in which each of the five three-state HMMs represents a different phonetic category, determining whether the audio speech input is a barge-in-speech input from the user, and if the audio speech input is determined to be the barge-in-speech input from the user, terminating the presentation of the prompt.

20 Claims, 7 Drawing Sheets

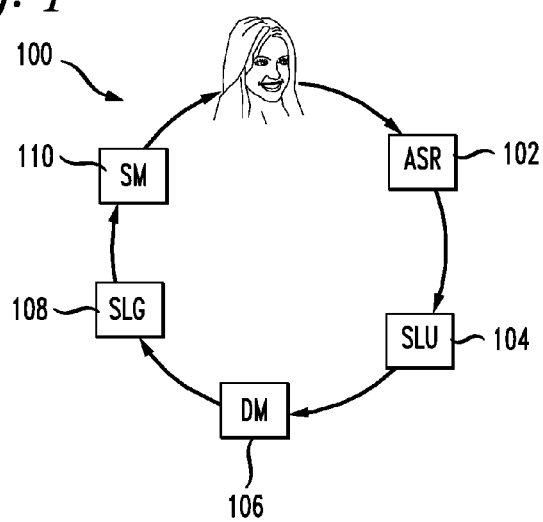
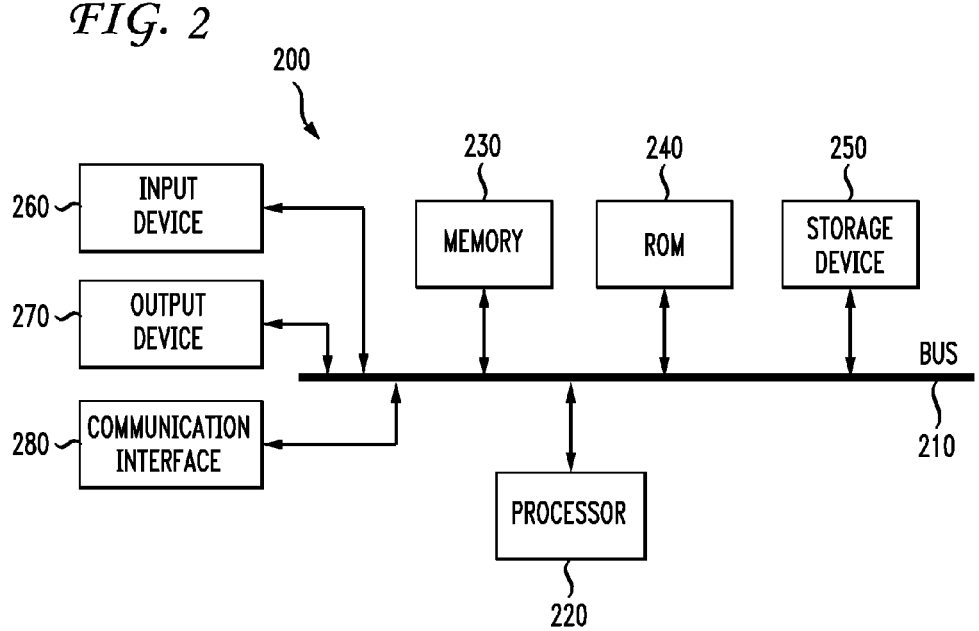

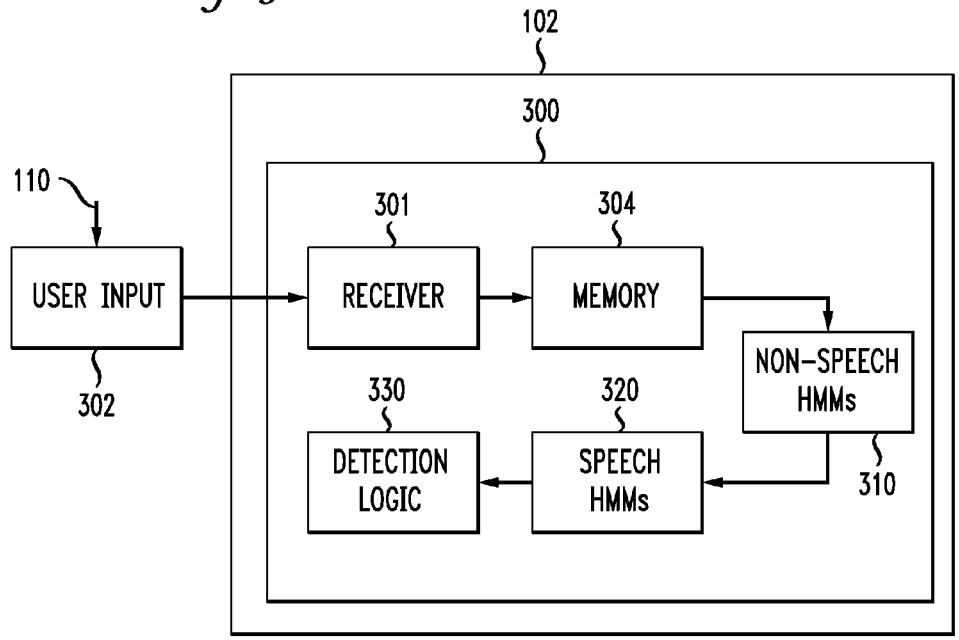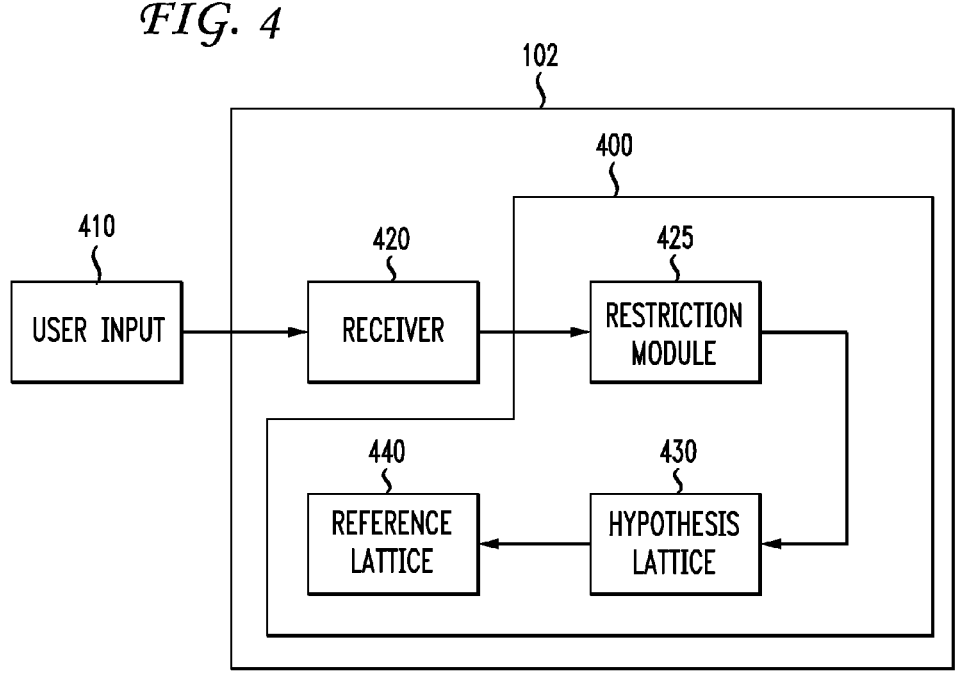

MULTI-STATE BARGE-IN MODELS FOR SPOKEN DIALOG SYSTEMS

PRIORITY INFORMATION

The present application is a continuation of U.S. patent application Ser. No. 11/930,619, filed Oct. 31, 2007, the content of which is included herewith in its entirety.

BACKGROUND OF THE INVENTION

1. Field of the Invention

The present invention relates to spoken dialog systems in general and, more particularly, to a multi-state barge-in-model and its use in handling barge-in speech in a spoken dialog with an automated system.

2. Introduction

Speech processing technologies have since their inception been involved, in some way or another, with the problem of detecting speech, whatever the acoustic environment. The problem of accurately distinguishing speech from the background is still an active area of research.

In practice there are three different applications involving speech detection. They differ in their intent and the mechanisms used to achieve their targets. The first application determines if speech is present, it is commonly referred to as the Voice Activity Detection (VAD). The VAD application tries to detect every non-speech segment within a continuous utterance, for example, a short pause. Another application, most commonly encountered in automatic speech recognition (ASR) applications is the problem of endpointing. This is important when detecting the beginning and the end of an utterance, the ASR system is relied on to internally determine if there are any utterance internal pauses.

Barge-in is a unique speech detection problem that only occurs in dialog based applications. Barge-in happens when a user of an automated dialog system attempts to input speech during the playback/synthesis of a prompt generated by the dialog system. In this unique situation, two things are expected to occur, virtually instantaneously. First the prompt is immediately terminated, both to indicate to the user that the system is listening to him/her, and to allow uninterrupted recognition of the user's utterance. At the same time, the ASR engine starts processing the accumulated speech starting some short amount of time prior to the detected barge-in. In the case of barge-in, the system faces only a relatively small subset of the problems faced by the VAD systems. Conversely, the errors can have a significant impact to the perceived usability of the system and might cause it to be abandoned. A false barge-in, which happens when the system incorrectly believes that there is speech input by the user, will terminate the prompt. This termination of the prompt leaves the user without proper guidance for providing the appropriate input to the system. This can have a long term effect diverting the dialog away from the intended operation for many turns. Conversely, if by trying to minimize false alarms, the system becomes less sensitive to speech input and fails to barge-in, the user may find it uncomfortable speaking while the prompt is still active. The user's discomfort corrupts their delivery of the speech input affecting the ASR due to the unnaturalness of the input. In addition this often leads to unwanted echo and consequent poor recognition performance. This is assuming the ASR system is left active all the time, and not initiated by the barge-in detection, in which case the speech would be lost to the system.

The ideal barge-in response requires minimum latency, responding to the speech input as quickly as possible, while requiring high level of accuracy in detecting speech. Those two criteria are contradictory and are often traded off one against the other.

The overall dialog system scenario implies, to a large extent, that the barge-in performance is tightly coupled with the ASR system. In essence, a flawless barge-in performance that negatively impacts the ASR performance is detrimental to the system performance, and vice-versa. In many ways the best barge-in system is the ASR system, with the serious drawback that its latency is too long. Accordingly, what is needed in the art is an improved method of processing barge-in input from a user.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer readable media for applying a multi-state barge-in acoustic model in a spoken dialogue system. The method includes the steps of (1) presenting a prompt to a user from the spoken dialog system, (2) receiving an audio speech input from the user during the presentation of the prompt, (3) accumulating the audio speech input from the user, (4) applying a non-speech component having at least two one-state Hidden Markov Models (HMMs) to the audio speech input from the user, (5) applying a speech component having at least five three-state HMMs to the audio speech input from the user, in which each of the five three-state HMMs represents a different phonetic category, (6) determining whether the audio speech input is a barge-in-speech input from the user, and (7) if the audio speech input is determined to be the barge-in-speech input from the user, terminating the presentation of the prompt. The principles of this system may be utilized to facilitate a user's interaction which spoken dialogue systems. The principles of this system may also be used to train spoken dialogue systems how to detect when a user is interrupting an automated prompt.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which FIG. 1 illustrates a functional block diagram of an exemplary natural language spoken dialog system;

FIG. 2 illustrates a illustrates the basic hardware components of an embodiment;

FIG. 3 illustrates a system for discriminative training of multi-state barge-in-models embodiment of the system;

FIG. 4 illustrates a method for discriminative training of multi-state barge-in-models embodiment of the system;

DETAILED DESCRIPTION

Figure 5:
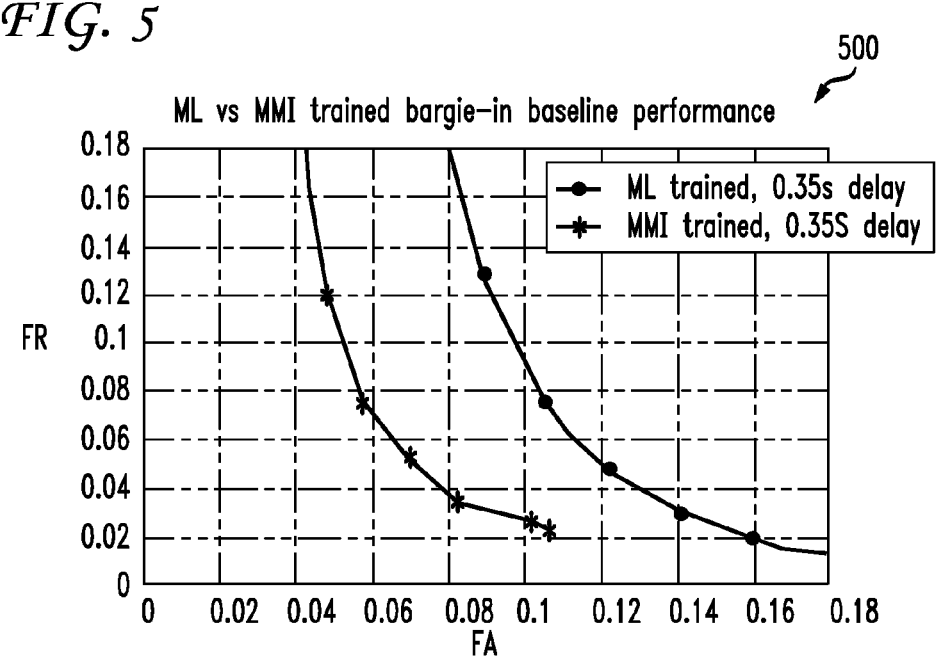
FIG. 5 is a diagram showing the results of the baseline performance with the ML and MMI trained barge-in-model in accordance with the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention relates to an improved method of generating a spoken dialogue service and specifically the barge-in aspect. A computer system may process some or all of the steps recited in the claims. Those of ordinary skill in the art will understand whether the steps can occur on a single computing device such as a personal computer having a Pentium central processing unit, or whether some or all of the steps occur on various computer devices distributed in a network. The computer device or devices will function according to software instructions provided in accordance with the principles of the invention. As will become clear in the description below, the physical location of where various steps in the methods occur is irrelevant to the substance of the invention disclosed herein. The important aspect of the invention relates to the method of using existing data associated with an enterprise, such as a company, to rapidly deploy a spoken dialogue system having acceptable accuracy rates for the domain of information and conversation associated with the enterprise. Accordingly, as used herein, the term "the system" will refer to any computer device or devices that are programmed to function and process the steps of the method.

Spoken dialog systems aim to identify intents of humans, expressed in natural language, and take actions accordingly, to satisfy their requests. FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and synthesizing module 110. The synthesizing module may be any type of speech output module. For example, it may be a module wherein one of a plurality of prerecorded speech segments is selected and played to a user. Thus, the synthesizing module represents any type of speech output. The present invention focuses on innovations related to the dialog management module 106 and may also relate to other components of the dialog system.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to interact in a natural way and help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. Synthesizing module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog."

FIG. 2 illustrates an exemplary processing system 200 in which one or more of the modules of system 100 may be implemented. Thus, system 200 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to the synthesized voice, the output device may include a speaker that generates the audible sound representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200. System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

The diagram in FIG. 3 illustrates a multi-state barge-in-model 300, which includes a receiver 302, a memory module 304, a non-speech hidden Markov model (HMM) 310, a speech HMM 320, and a detection module 330. The model in 300 may also include modules from the processing system 200.

The present disclosure discusses how the inventors discriminatively train a hidden Markov model (HMM) based barge-in acoustic model. Unlike the more conventional Gaussian mixture models (GMMs) which normally have one GMM for speech and one for non-speech, which leads to easy input labeling, multi-state HMMs have a large number of correct potential alignments. All alignments which satisfy the condition that some of the HMM states (the speech states) are aligned with the speech portion of the signal and some of the non-speech states are aligned with the rest of the input. Since discriminative training techniques require the "truth" to be known, this ambiguity creates a difficulty. Disclosed herein is a method for avoiding this obstacle resulting in greatly improved barge-in performance on a large number of speech utterances from different applications.

One of the difficulties of training and evaluating barge-in models is the inability to replicate the real-life barge-in conditions in sufficient numbers for collecting truly representative data. Even when this is ignored, it is necessary to label a large amount of data for speech and non-speech which can be very time consuming, especially if done on large amount of speech. It is necessary, however, to evaluate on large databases to achieve an accurate representation of barge-in performance on different tasks under realistic conditions. Those problems are circumvented by using all of the data which was collected for training the latest version of the AT&T acoustic model for commercial applications. This database of well over 1000 hours of speech, over a million utterances and about 10 million words consists of speech collected as part of dozens of different collection scenarios, from real life customer applications to recordings designed with specific targets for data collection. It includes general English utterances, alphabet and digit strings, both in isolation and combined, isolated utterances, short utterances like names, and many others. It provides a great variability for both training the barge-in models and testing of barge-in performance. Unlike most publications on speech detection, we are not so concerned with artificially adding noise to clean speech recordings to simulate what might happen in real-life conditions. With the appropriate data, the task is to evaluate and improve the performance on the data the recognition system encounters in its usual applications.

Given the size of the data, the approach to the barge-in problem was seen from a different perspective. First, the models are so small relative to the amount of data available that the question of overtraining would be ignored. Consequently, training data is also used as the testing data. The main problem was the labeling of so much speech, but given the quantity, it was decided that even a noisy labeling was going to be adequate. The current version of the acoustic model trained on this data was used for forced alignment of the speech with the lexical transcriptions. For convenience, the speech segments were excised and became the training data for the speech part of the barge-in model. Similarly, the non-speech parts of the database were excised to become the training data for the non-speech part of the barge-in model.

Matching the ASR and the barge-in 300 configurations is done to optimize the system by using multiple HMMs for speech and non-speech. The barge-in model 300 uses four HMMs, two single-state HMMS 310, and two three-state HMMs 320, positioned left-to-right, to preserve the non-speech part of the acoustic model. The aforementioned eight HMM states each represent a Gaussian mixture. Preserving the non-speech part of the ASR model 102 facilitates bootstrapping because the barge-in-model uses the original HMM parameters. The speech part of the model also continues to use the original parameters of the ASR model. The ASR model has phoneme labels that are partitioned into five categories: vowels and glides, unvoiced fricatives, voiced fricatives, other consonants, and nasals. The speech part of the barge-in model 300 consists of five three state left-to-right HMMs 320, based on the ASR model phonemic segmentation of the training data, after relabeling into one of the five phoneme classes.

Processing the training data is done by using a standard 13-dimensional mel-filterbank cepstral analysis every 10 ms. No additional processing is used to minimize latency and processor usage. The training of the barge-in model 300 follows the usual steps of training a recognition acoustic model. The only difference is that instead of forcing the alignment of the reference transcriptions, the barge-in-model forces an arbitrary sequence of only non-speech HMMs 310 for the non-speech segments. Initially, for the speech segments, in addition to forcing the use of the speech HMMs 320, the use of non-speech HMMs 310 is also permitted, but with a very large insertion cost. It can be thought of as a language model cost, which was set to 6, for insertion of an HMM with the language model weight of 16. All other HMMs have the insertion cost set to 1. As will be seen later, the use of insertion cost can be used to manipulate the trade-off between the false insertion and false acceptance in the barge-in performance. The reason for allowing non-speech HMMs during the speech segments is that automatic forced alignment of recognition acoustic models, due to their context-dependent HMM structure and thus somewhat arbitrary placement of phoneme boundaries, often exhibit the tendency to include some of the non-speech portion of the signal as part of the utterance initial or final phoneme. Each HMM had a gamma duration distribution associated with it, and the weight given to the duration model was the same as the weight given to the language model. The maximum likelihood (ML) training of the barge-in model which consisted of several iterations of Viterbi training on all the available data produced the initial performance reference, expressed, as all the other results here, as an receiver operating character (ROC) curve between false acceptance (detecting speech during non-speech segments) and false rejection (failing to detect speech when present). Adjustment can be made to the model performance by using very simple logic of detecting 330 contiguous speech segments of n frames, with n=1, 5, 10, 15, 20, 25, 30. If such a segment is detected within the first 350 ms, or 35 frames, than it is considered a correct detection. If it is detected too late it is a false rejection (FR), and if a speech segment is detected anywhere during the non-speech segments, it is considered a false acceptance (FA).

Another alternative embodiment for training a multi-state barge-in-model 400 will be described with reference to FIG. 4. There are two ways to view a barge-in model training during a speech recognition training scenario. The first is to view the model as a two word problem, with speech being one word, and non-speech as the other. The model views different HMMs as the phoneme inventory, and any phoneme sequence is a valid alternative pronunciation, as long as the model uses only speech HMMs for the speech "word", and non-speech HMMs for the non-speech "word". The other approach is to think of the HMMs as the words, where any word sequence of the speech "words" during the speech segment is valid, and similarly any sequence of non-speech "words" is valid during the non-speech segment. In practice, this makes little difference as the training process ends up doing the same steps.

For example, an input signal is provided by the user. The input signal 410 is received by an ASR module 102. A restriction module 425 within the multi-state barge-in model's 400 places grammatical restrictions on the input signal 410. The multi-state barge-in-model 400 replaces the reference transcription by forcing the alignment with restricting grammar recognition. The hypothesis lattice 430 is generated by allowing any sequence of the speech and non-speech HMMs. The reference lattice 440 is obtained by recognizing the most likely HMM sequence, but allowing only speech HMMs for the speech segments, and non-speech HMMs for the non-speech segments. This way, different iterations of the ML and MMI training end up having different reference transcriptions. However, the restrictions on the speech segments are only matched with the speech HMMs and the non-speech segments are matched with the non-speech HMMs is preserved. This is relaxed, slightly, to allow for the non-speech HMM alignments during the possible mis-labeling at the beginning and end of the speech segments as described earlier, because the manual transcriptions in terms of speech and non-speech were not available.

Thus, system 400 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

The test data used in the experiments is the same as the training data, consisting of over a million utterances. As in the training, it has been partitioned into speech and non-speech segments, as determined by forced alignment of the lexical reference transcriptions.

The initial experiments utilized all the segments in training and evaluating the model. In that respect it followed the VAD scenario rather then the barge-in requirements. The barge-in performance of the ML trained and the MMI trained model is shown in the graph 500 FIG. 5. Graph 500 shows the baseline performance with the ML and MMI trained barge-in models, trained and tested on all available data. In order for the barge-in performance to be considered acceptable, the speech detection had to occur within the first 350 ms (35 frames).

The experimental results shown in FIG. 5 demonstrate the benefit of discriminative training, and the trade off between false acceptance (FA) and false rejection (FR) performance. The low FR end of the curve corresponds to detecting a single speech frame by the decoding of the barge-in model. The low FA end is achieved by detecting the minimum of n=30 frames, both within the first 350 ms of the speech segment, or within the segment, regardless of length. In reality, most of the detections occur much before the 350 ms are up, and many initial speech segments are shorter than 350 ms, making the FR score at the high FR end of the. However, close to the operating point of 10-15 frames limit, the performance is depicted accurately.

Figure 6:
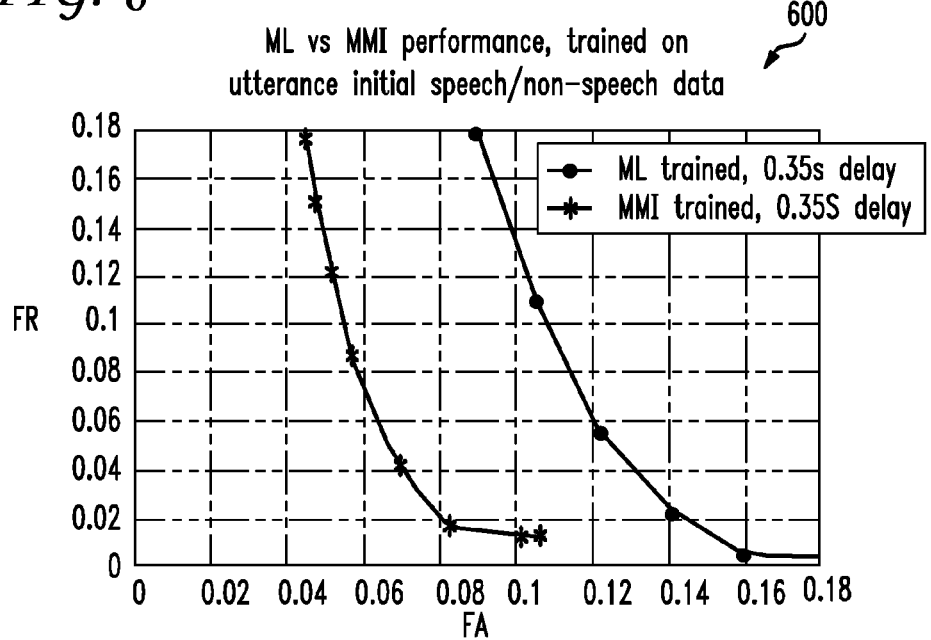
FIG. 6 is a diagram showing the results of the initial speech/non-speech data performance with the ML and MMI trained barge-in-model in accordance with the present invention.

Given that the intended use for the model was barge-in, the next configuration used only the initial silence preceding the utterance to train the non-speech HMMs, and only the initial speech segment, before any pauses and only up to 50 frames (0.5 s in length). The performance is shown in the graph 600 of FIG. 6 which shows the performance with the ML and MMI trained barge-in model, trained and tested only on the initial non-speech and speech data. The benefit of this approach reflects a significant reduction in the FR performance.

Figure 7:
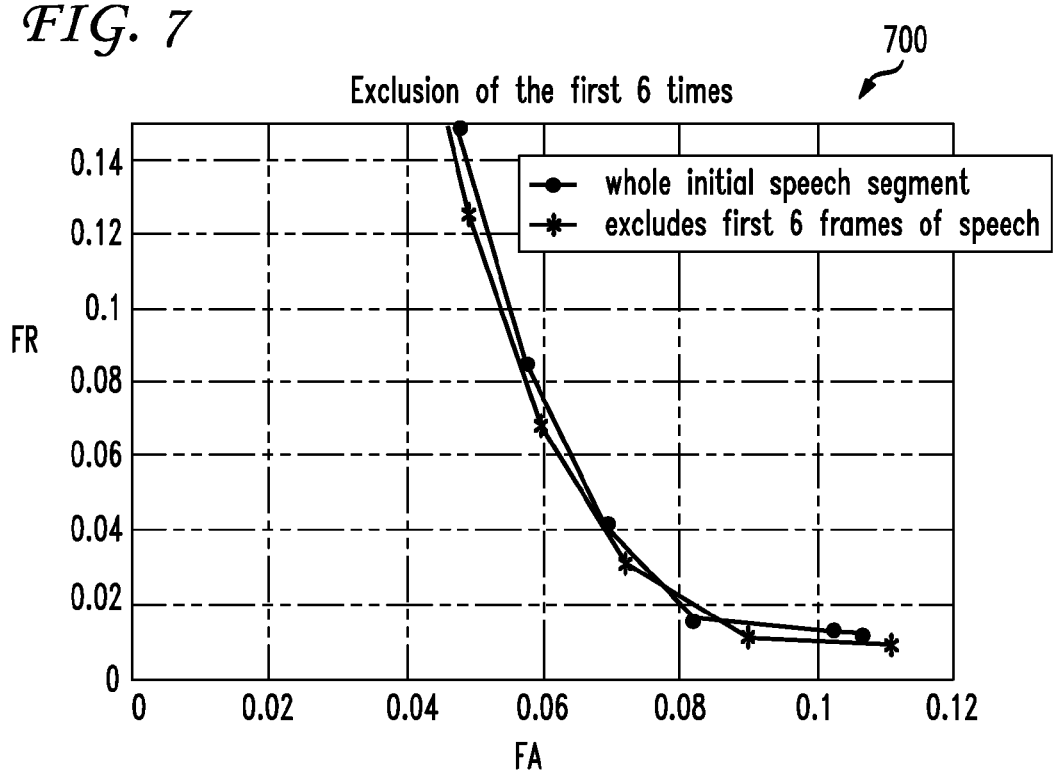
FIG. 7 is a diagram showing the results of the exclusion of the first 6 frames in the initial speech/non-speech data performance with the ML and MMI trained barge-in-model in accordance with the present invention.

The results of removing moderately frequent additions of a few frames of non-speech to the beginning of the initial speech segments are shown in the Graph 700 of FIG. 7. This shows the performance with the ML and MMI trained barge-in model, trained and tested only on the initial non-speech and speech data. Also, few utterances appeared to be erroneous, as the initial speech segments had the length of only a few frames. In the next results, the first 6 frames of the speech segment were removed from the training and testing speech segments and all the speech segments of less than 15 frames were discarded, and given that the first 6 frames were removed, the minimum segment length was 9 frames. So few utterances were discarded that it does not change the ROC curves. The comparison of the performance by the MMI trained models is shown in FIG. 7.

The improvement is at best modest and it appears that it is not necessary to provide special handling for the infrequent inaccuracies of the segmentation into speech/non-speech segments by forced alignment.

Figure 8:
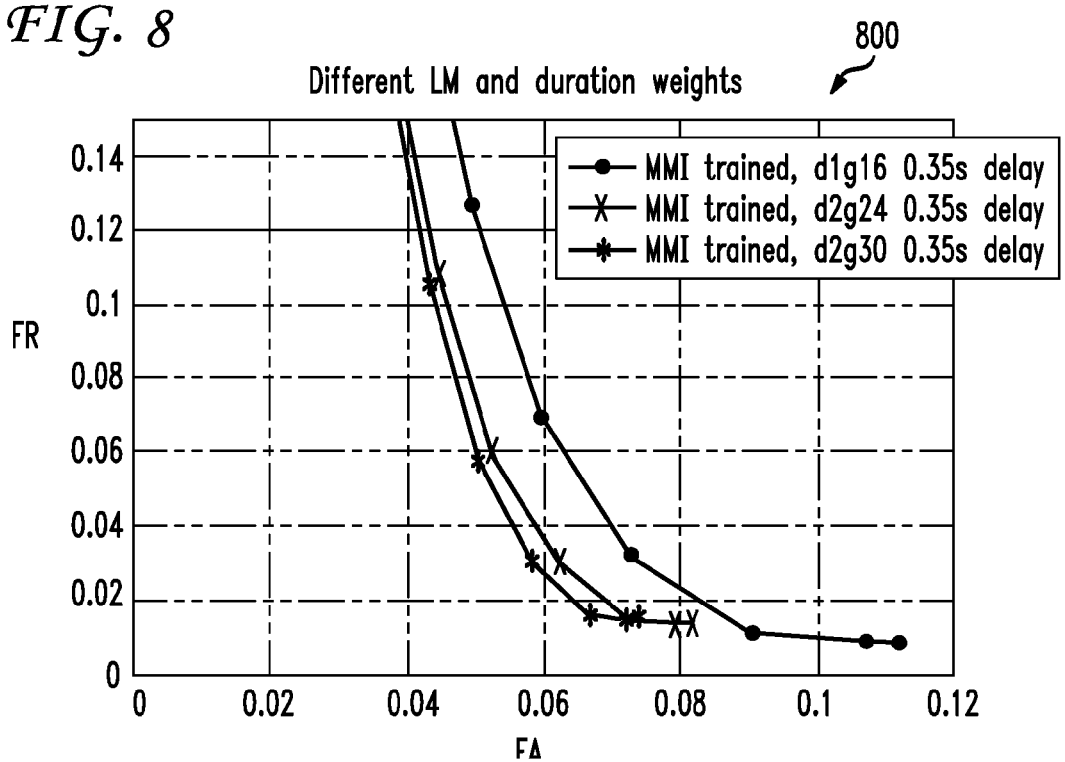
FIG. 8 is a diagram showing the results of the different language models and duration weights in the initial speech/non-speech data performance with the ML and MMI trained barge-in-model in accordance with the present invention.

The final experiment illustrated in the graph 800 of FIG. 8 compares the effect of varying the cost of inserting speech and non-speech HMMs. This shows the performance of an MMI trained barge-in model, trained and tested only on the initial non-speech and speech data, with different language and duration model weights Given that the search network already had costs associated with inserting any of the HMMs models, this achieved by changing the network (language model) cost weight when doing the decoding. The same can be done with the duration model as well. The small loss in FR performance is more than offset by an improvement in the FA performance as the language model (LM) and the duration weights are increased. The performance MMI trained barge-in model, trained and tested only on the initial non-speech and speech data, with different language and duration model weights.

Figure 9:
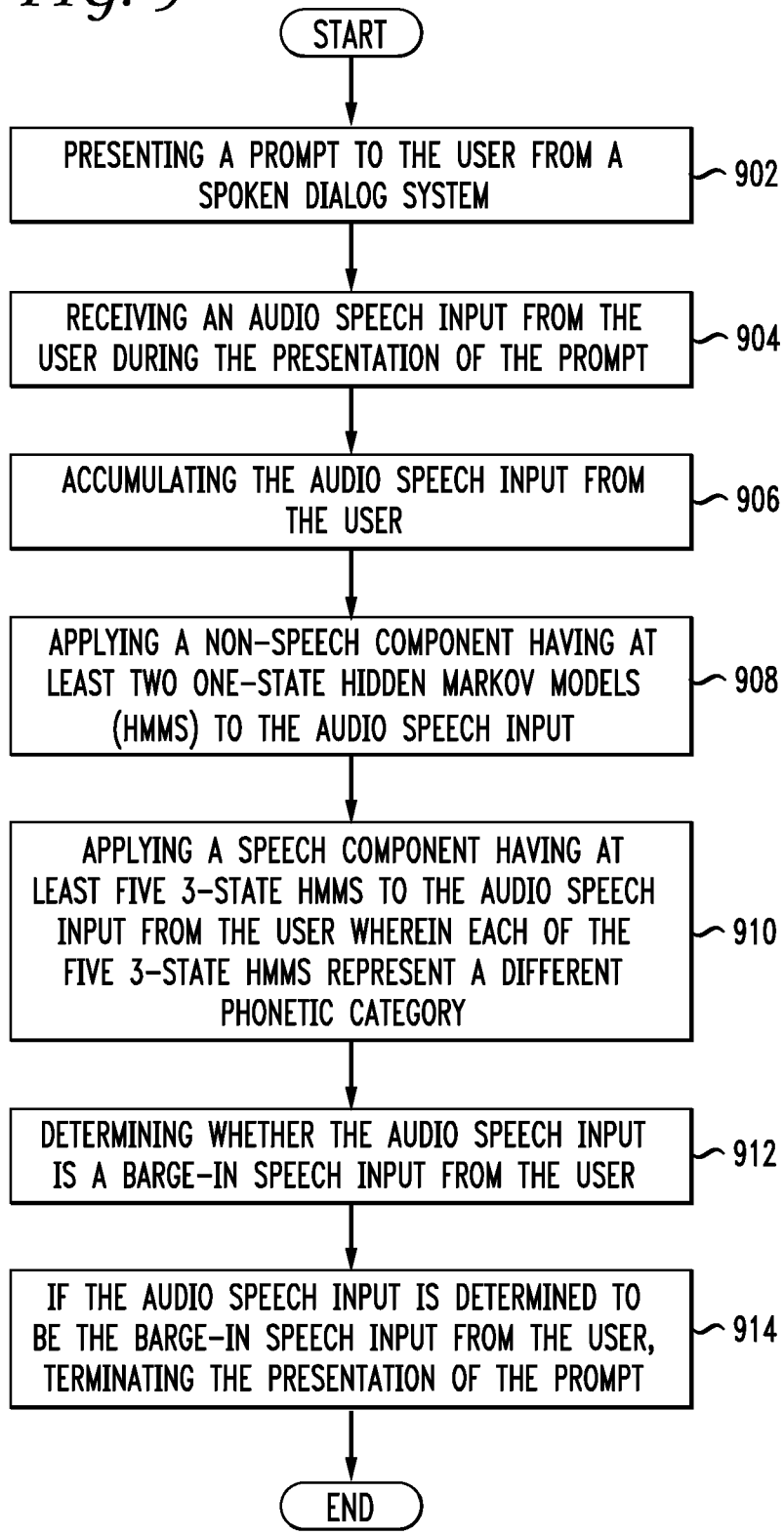
FIG. 9 illustrates a method embodiment of the invention.

Other method embodiments of the invention include a method of applying a multi-state barge-in acoustic model in a spoken dialog system. This method is illustrated in FIG. 9. As shown, the method includes presenting a prompt to the user from a spoken dialog system (902), receiving an audio speech input from the user during the presentation of the prompt (904), accumulating this audio speech input from the user (906), applying a non-speech component having at least two one-Hidden Markov Models (HMMs) to the audio speech input (908), applying a speech component having at least five 3-state HMMs to the audio speech input from the user wherein each of the five 3-state HMMs represent a different phonetic category (910), determining whether the audio speech input is a barge-in speech input from the user (912), and if the audio speech input is determined to be the barge-in speech input from the user, terminating the presentation of the prompt (914).

Each of the described phonetic categories may include vowels and glides, unvoiced fricatives, voiced fricatives and other constants and nasals. An automatic speech recognition model phonetic segmentation of a training data is categorized and relabeled into different phoneme classes. Another aspect of this embodiment involves training the multi-state barge-in acoustic model using maximum likelihood (ML) training to detect speech during non-speech segments and to detect failure of speech when present. The multi-state barge-in acoustic model may further be trained using maximum mutual information (MMI) criterion discriminative training. Contiguous speech segments may be detected and used to adjust the multi-state barge-in acoustic model. Yet another aspect of this embodiment involves accumulating the audio speech input at a time prior to the time when it is determined that the user is providing barge-in speech input.

Figure 10:
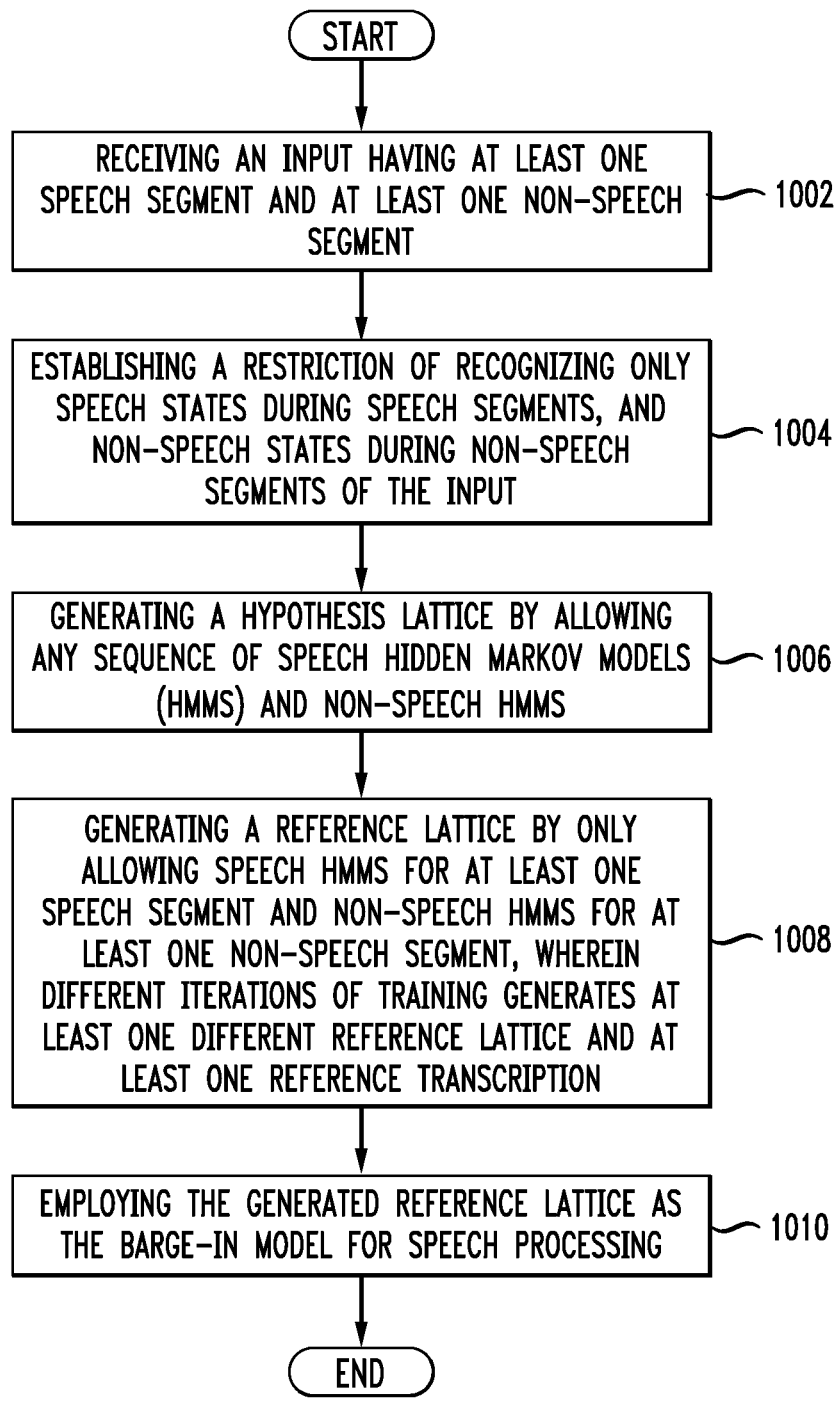
FIG. 10 illustrates yet another method embodiment of the invention.

Yet another embodiment of the invention relates to a method of training a barge-in model that is later used for speech processing preferably in a spoken dialog system. This method is illustrated in FIG. 10. As shown in FIG. 10, this illustrates a method including receiving an input having at least one speech segment and at least one non-speech segment (1002), establishing a restriction of recognizing only speech states during speech segments, other input and non-speech states during non-speech segments of the input (1004), generating a hypothesis lattice by allowing any sequence of speech Hidden Markov Models (HMMs) and non-speech HMMs (1006), generating a reference lattice by only allowing speech HMMs for at least one speech segment and non-speech HMMs for at least one non-speech segment, wherein different iterations of training generates at least one different reference lattice and at least one reference transcription (1008) and employing the generated reference lattice as the barge-in model for speech processing (1010). The barge-in model may use a maximum likelihood (ML) training steps and a maximum mutual information (MMI) as part of their training steps. In one aspect, the at least one reference lattice is redefined at each iteration of training. During the training process, the speech may be recognized as one word and non-speech may be recognized as being an additional word or a other non-word audio. Recognizing non-speech states during speech segments may be an aspect of this method, but they may only be recognized with a high penalty to minimize such occurrences. Furthermore, the restriction referenced above may be slightly relaxed to allow for non-speech HMM alignments due to mislabeling at a beginning or ending of received speech segments.

Figure 11:
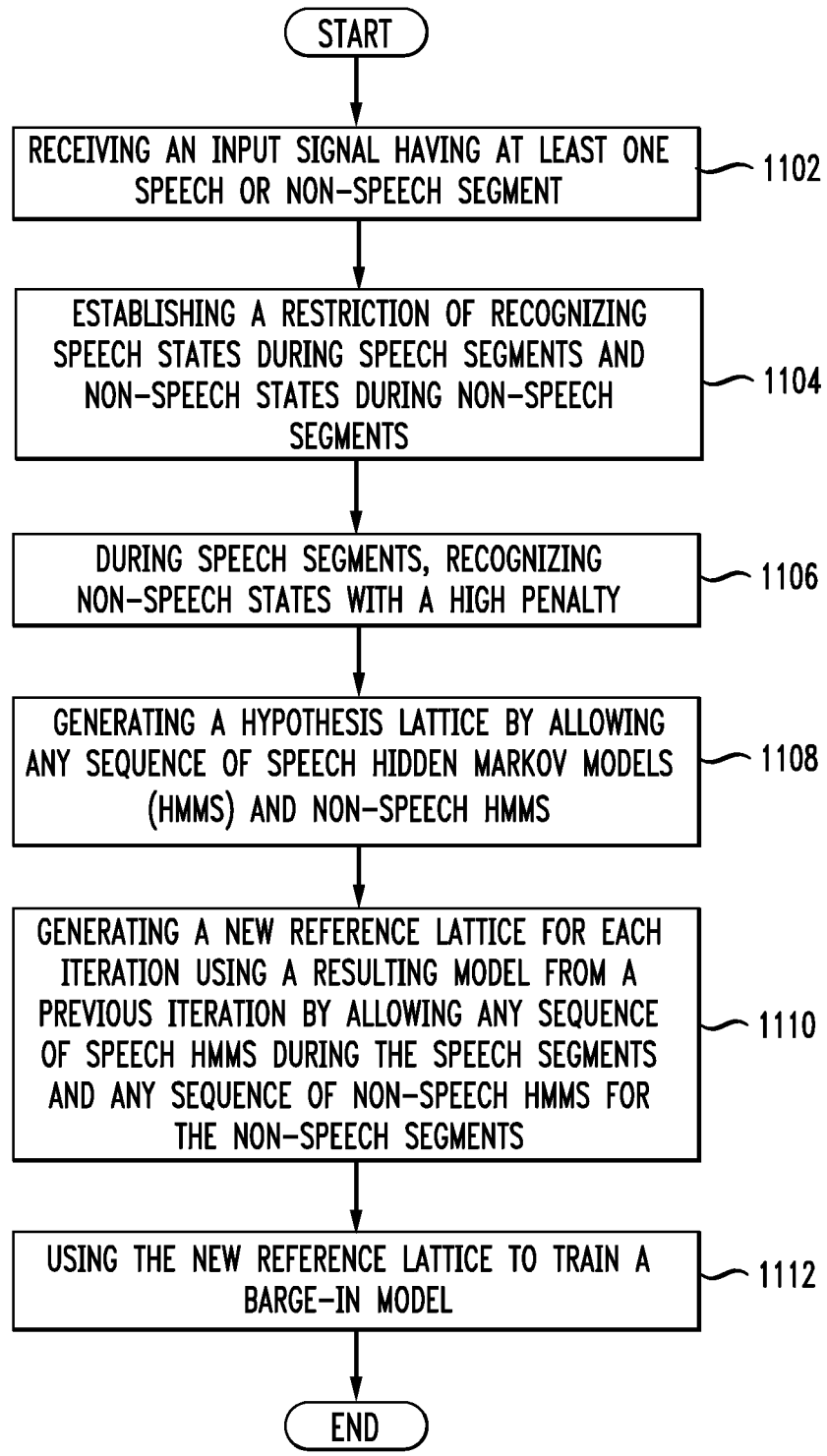

Another embodiment in the invention is illustrated by the method flow diagram of FIG. 11. FIG. 11 illustrates a method of discriminatively training a barge-in model. The method includes receiving an input signal having at least one speech or non-speech segment (1102), establishing a restriction of recognizing speech states during speech segments and non-speech states during non-speech segments (1104), during speech segments, recognizing non-speech states with a high penalty (1106), generating a hypothesis lattice by allowing any sequence of speech Hidden Markov Models (HMMs) and non-speech HMMs (1108), generating a new reference lattice for each iteration using a resulting model from a previous iteration by allowing any sequence of speech HMMs during the speech segments and any sequence of non-speech HMMs for the non-speech segments (1110) and using the new reference lattice to train a barge-in model (1112).

The method of FIG. 11 may further include permitting non-speech HMMs to account for potential errors in the placement of speech/non-speech boundaries by an automatic speech recognition (ASR) model.

A barge-in system has been developed for use in dialog systems, attempting to maximize the performance of the complete system. In order to achieve this goal the barge-in model was designed to in many ways mimic the ASR model, including using the same non-speech HMMs, and similar number of HMMs to represent the speech segments. The training follows the standard ML and MMI training steps, except that the reference transcriptions were redefined at all iterations of training, since they are arbitrary for speech/non-speech determination. The HMM based barge-in model can achieve very low FR rates, and the MMI training reduces the FA acceptance rate by a half at a given FR operating point. Given how often barge-in problems affect the dialog system performance, such a large performance improvement in false acceptance rate implies a significant improvement in dialog completion rates and customer satisfaction scores.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
receiving an input having a speech segment and a non-speech segment;
establishing a first restriction of recognizing only speech states during the speech segment;
establishing a second restriction of recognizing only non-speech states during the non-speech segment;
generating, via a processor, a hypothesis lattice, wherein the hypothesis lattice allows any sequence of speech states and non-speech states; and
generating a reference lattice, wherein the reference lattice is based on the hypothesis lattice and conforms to the first restriction and the second restriction.

2. The method of claim 1, wherein the speech states and the non-speech states are Hidden Markov Models.

3. The method of claim 1, further comprising employing the reference lattice as a barge-in model for speech processing.

4. The method of claim 3, wherein the barge-in model is trained using a maximum likelihood training on data partitioned into the speech segment and the non-speech segment.

5. The method of claim 4, wherein the maximum likelihood training determines maximum likelihood based on shared data between the speech segment and the non-speech segment.

6. The method of claim 1, wherein the reference lattice is redefined at each iteration of training 7. The method of claim 1, wherein of the first restriction and the second restriction allows for re-alignment due to mislabeling of the input.

8. A system comprising:
a processor; and
a storage device having instructions stored which, when executed by the processor, cause the processor to perform operations comprising:
receiving an input having a speech segment and a non-speech segment;
establishing a first restriction of recognizing only speech states during the speech segment;
establishing a second restriction of recognizing only non-speech states during the non-speech segment;
generating a hypothesis lattice, wherein the hypothesis lattice allows any sequence of speech states and non-speech states; and
generating a reference lattice, wherein the reference lattice is based on the hypothesis lattice and conforms to the first restriction and the second restriction.

9. The system of claim 8, wherein the speech states and the non-speech states are Hidden Markov Models.

10. The system of claim 8, wherein the storage device has additional instructions stored which result in the operations further comprising employing the reference lattice as a barge-in model for speech processing.

11. The system of claim 10, wherein the barge-in model is trained using a maximum likelihood training on data partitioned into the speech segment and the non-speech segment.

12. The system of claim 11, wherein the maximum likelihood training determines maximum likelihood based on shared data between the speech segment and the non-speech segment.

13. The system of claim 8, wherein the reference lattice is redefined at each iteration of training 14. The system of claim 8, wherein of the first restriction and the second restriction allows for re-alignment due to mislabeling of the input.

15. A computer-readable storage device having instructions stored which, when executed by a computing device, cause the computing device to perform operations comprising:
receiving an input having a speech segment and a non-speech segment;
establishing a first restriction of recognizing only speech states during the speech segment;
establishing a second restriction of recognizing only non-speech states during the non-speech segment;
generating a hypothesis lattice, wherein the hypothesis lattice allows any sequence of speech states and non-speech states; and
generating a reference lattice, wherein the reference lattice is based on the hypothesis lattice and conforms to the first restriction and the second restriction.

16. The computer-readable storage device of claim 15, wherein the speech states and the non-speech states are Hidden Markov Models.

17. The non transitory computer-readable storage device of claim 15, the computer readable storage device having additional instructions stored which result in the operations further comprising employing the reference lattice as a barge-in model for speech processing.

18. The computer-readable storage device of claim 17, wherein the barge-in model is trained using a maximum likelihood training on data partitioned into the speech segment and the non-speech segment.

19. The computer-readable storage device of claim 18, wherein the maximum likelihood training determines maximum likelihood based on shared data between the speech segment and the non-speech segment.

20. The computer-readable storage device of claim 15, wherein the reference lattice is redefined at each iteration of training.

* * * * *